Feb. 11, 1969 A. M. HERZIG ET AL 3,426,629
METHOD OF CUTTING AND SCORING A SQUEEZE CONTAINER CLOSURE
Filed Jan. 25, 1967

INVENTORS
ALBERT M. HERZIG
BENJAMIN D. MENKIN
Herzig, Walsh & Blackham
ATTORNEYS

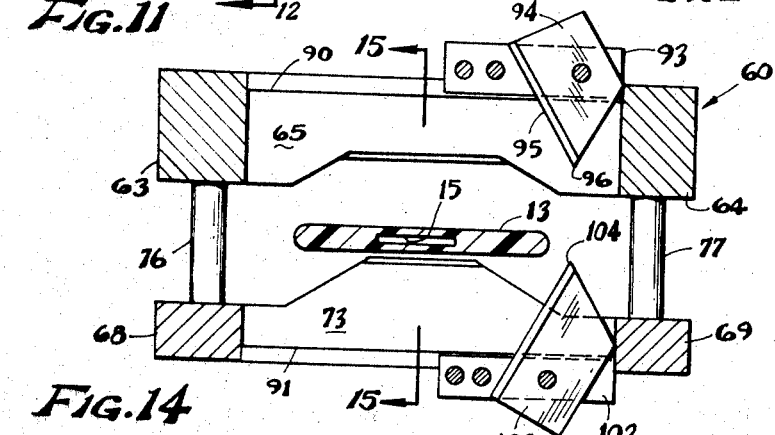

United States Patent Office 3,426,629
Patented Feb. 11, 1969

3,426,629
METHOD OF CUTTING AND SCORING A SQUEEZE CONTAINER CLOSURE
Albert M. Herzig, 9465 Wilshire Blvd., Beverly Hills, Calif. 90212, and Benjamin David Menkin, c/o Menda Scientific Products, 11527 W. Washington Blvd., Los Angeles, Calif. 90066
Filed Jan. 25, 1967, Ser. No. 611,639
U.S. Cl. 83—7
Int. Cl. B26d 3/08, 7/08
2 Claims

ABSTRACT OF THE DISCLOSURE

A method for making cuts and score lines in the closure of a squeeze container in order to provide a tear-off strip. Cuts are made through the side edges of the material aligned and score lines in the surface of the sealed two layers of material which form the closure. The material of the closure is held so as to deform side portions of it out of the plane of the intermediate part. Upper and lower knives are then moved transversely so that one knife provide side cuts and both knives cut partially through the thickness of the intermediate part to form scores in the upper and lower surfaces thereof.

Summary of the invention

The closure means is provided by the flattened neck of resilient material, the flattened sides of which are heat sealed together leaving an unsealed area. Holes are punched in the heat sealed areas and a stiffening clip or rib is applied holding the material laterally stretched. The stiffening member is applied in the optimum position, that is, in the position at which liquid can be forced out through the closure by application of only the minimum threshold pressure or force. Improved tangs are formed in the holding clip or stiffening member to provide optimum holding strength without tearing.

Improved methods and means are provided for fabricating the tear-off strip. By this method and means side cuts and score lines on opposite sides of the closure means are effectively provided for in a tool for this purpose. The material of the closure means is held in a die which deforms side parts of the closure means out of a plane. Knives then move transversely with respect to the closure means so that one knife cuts completely though the side portions that are deformed out of a plane and the score lines are simultaneously made through the itermediate part.

In the light of the foregoing, it is a primary object of the invention to provide and make available certain particular improvements in automatic closures of the type referred to in the foregoing, contributing to their effectiveness and further to make available improvements in the process or technique for fabricating or producing the closures.

The container with the automatic closure may initially at the time of manufacture be positively sealed by way of a tear strip at the end of the closure which can be manually torn off, exposing the discharge opening. As shown in prior art Patent No. 2,815,150 preferably the tear strip may be provided for by way of side cuts through the material of the closure, and score line on opposite sides of the closure member aligned with the side cuts. A further and particular object of this invention is to provide improved methods and means for forming these side cuts and score lines whereby the tear strip of the closure may be torn off.

Figure 1:
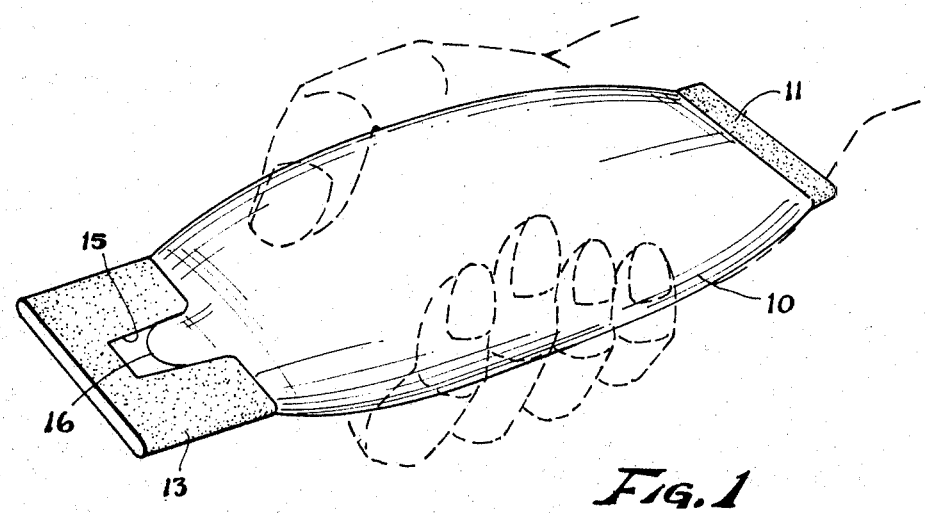
Figure 2:
Figure 4:
Figure 3:
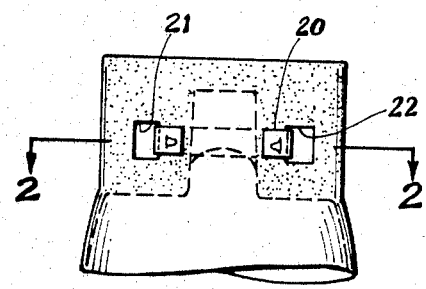
Figure 5:
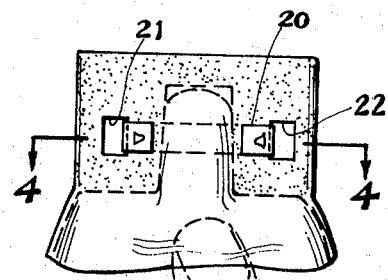
Figure 6:
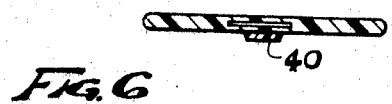
Figure 7:
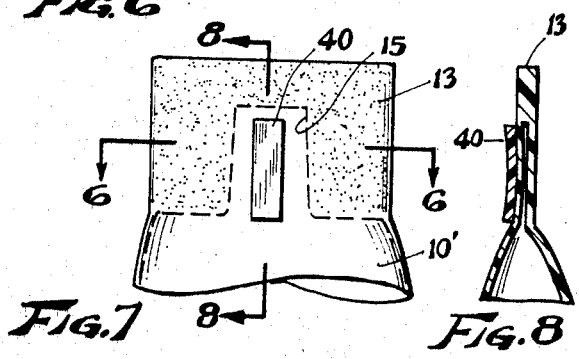
Figure 8:
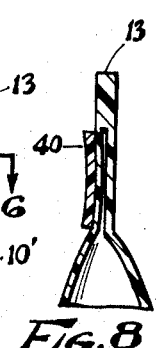
Figure 9:
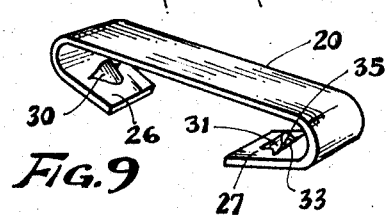

Further objects and additional advantages of the invention will become apparent from the following detailed description and annexed drawings wherein:

FIGURE 1 is a perspective view of a squeezable container having the closure means of the invention before the fabrication of the closure has been completed;
FIGURE 2 is a cross-sectional view taken along the line 2—2 of FIGURE 3;
FIGURE 3 is a view of a preferred form of the closure means of the invention, shown without the cuts and score lines for the tear strip;
FIGURE 4 is a sectional view taken along the line 4—4 of FIGURE 5;
FIGURE 5 is a view like FIGURE 3 illustrating the effect of pressure upon the squeezable container with reference to the closure means;
FIGURE 6 is an end view of the closure of FIGURE 7, taken along line 6—6 of FIGURE 7;
FIGURE 7 is a view of a modified form of closure member;
FIGURE 8 is a side view of the closure means of FIGURE 7, taken along the line 8—8 of FIGURE 7;
FIGURE 9 is a detail view of the improved form of stiffening member or clip;
FIGURE 10 is an end view of the closure shown in FIGURE 11, taken along the line 10—10 of FIGURE 11;
FIGURE 11 is a view of the closure showing the side cuts and score lines;
FIGURE 12 is a side elevational view of the closure of FIGURE 11, taken on the line 12—12 of FIGURE 11;
FIGURE 13 is a perspective view of the closure means of FIGURES 10, 11 and 12;
FIGURE 14 is a schematic view of a preferred form of tool or die for making the side cuts and score lines of the closure of FIGURES 10 to 13;
FIGURE 15 is a side view of the tool or die of FIGURE 14, taken on the line 15—15 of FIGURE 14;
FIGURE 16 is a view of the die of FIGURE 14 with the jaws in closed position, and the cutting edges in operation;
FIGURE 17 is a perspective view illustrating the operation of the die of FIGURES 14 to 16; and
FIGURE 18 is a view of a modified form of die or tool for making the side cuts and score lines.

Referring now more particularly to FIGURE 1 of the drawings, it illustrates a squeezable container 10 which may be made of elastomeric material similar to the container of the previous patents and application referred to. The end of the container 10 is heat sealed at the end as shown at 11 and at the openable closure end as shown at 13, there being an unsealed neck or channel portion 15. The closure means shown in FIGURE 1 is not in the completely fabricated state. This figure illustrates that with the application of a relatively small force or pressure to the container, liquid in the container will be forced into the neck or channel 15 to a point as illustrated at 16, designating a bubble or meniscus at the end of the liquid. This position establishes a threshold pressure. To force the liquid further into the channel, it has been discovered, requires the application of a rather substantial additional force or pressure above and beyond the said threshold pressure. It is a purpose of the invention to take advantage of this phenomenon by placing the clip or stiffening member, which is designated at 20, in a position substantially at the point referred to, i.e., in a position which has at the outer edge of the bubble or at a point overlapping or wholly or at least partially overlying the bubble established by the said threshold pressure. The threshold pressure is that which precedes the effective stretching of the elastomeric closure material past the closure. That is to say, the threshold pressure is found without the closure device and is the pressure required to merely form the bubble. As such bubble is formed by pressure, for example, on the tube, the end of the outlet passage or opening outwardly of the bubble usually, if not invariably, deflects to one side or the other, thus effectively kinking the outlet until the application of greater pressure stretches or further stretches and forces the kink so the contents of the tube are extruded or flowed in the desired volume past the kink and through the outlet to discharge the tube.

The phenomenon of natural kinking of a flattened outlet appears to depend upon the geometry of the end of the tube and upon the geometry of the outlet. The tube body, being preferably cylindrical or elliptical in the cross-section perpendicular to its axis, is placed under manual pressure. The junction, usually tapered, of the neck or end of the tube adjacent the flattened outlet passage appears to come to a focus at the outer edge of the bubble so that some additional pressure—before the outlet is forced to stretch, open, or un-kink by the ultimate pressure—appears for a while to add to and accentuate the forces tending to deflect and kink the flattened (or bowed) outlet at the said focus or outer end of the resultant bubble.

So that said "some additional force" or "ultimate force" is utilized in desired extrusion of the contents of the tube and not by an undesired additional threshold of pressure to be overcome by the user, the effective desired closure means should effectively intersect or overlap the outer edge or focus of the bubble.

This bubble "focus" phenomenon may be used to reenforce the closure pressure within desired low manipulatable pressure bursts for users of the tubes while utilizing relatively thin (e.g., .010″) elastomeric container or outlet walls of plastics of the nature of rubber, soft vinyl and their like.

The process of fabrication of the closure means includes the making of the holes as designated at 21 and 22, and the application of the stiffening member. A preferred form of the stiffening member is shown in FIGURE 9. The preferred process of fabricating a closure means, as shown in FIGURES 2 to 5, is essentially that of the prior application referred to, and the prior Patent No. 2,815,150, except for the particular positioning of the stiffening member 20 as described, and providing for the tear strip as described hereinafter. Briefly, after the holes 21 and 22 are punched, the stiffening member 20 is applied by means of a clamping die. It holds the material of the closure means 13 laterally stretched.

The stiffening member 20 may be made of suitable bendable metal. It has inwardly bent end parts 26 and 27, which are clamped against the resilient material of the closure member. Formed in these end parts are gripping tangs or teeth 30 and 31. A particular feature of the invention lies in the configuration of these tangs. The material of the closure means is stretched laterally at the time that the stiffening member 20 is applied as described in the earlier application. The clamping ends 26 and 27 and the tangs or teeth in them, must be able to hold the resilient material without releasing it or tearing it. It has been found that this can be most effectively accomplished by tangs such as shown at 30 and 31. These tangs constitute material deformed from the surface of the end parts 26 and 27. Referring to the tang 31, there is a transverse cut 33 through the material of the end part 27. The material of the tang is then forced inwardly adjacent this single transverse cut into a configuration as shown. This configuration is similar to a half of a cone, split along a plane passing through the vertical axis of the cone. The configuration provides a shoulder 35 at the end of the surfaces that are deformed inwardly out of the plane of the end part 27 and having the configuration as shown. The tang 30 has a similar configuration. It has been found that these tangs are very effective and satisfactory for the purpose which has been set forth in the foregoing.

FIGURES 6, 7 and 8 show a modified form of a closure means embodying a stiffening member 40 which may be metal or other material having some rigidity. This member is narrower than the channel 50 and is placed along the channel as shown. FIGURES 6, 7 and 8 show this modification in a form in which it is not completely fabricated. It is to be understood that the end part of the closure member is cut off approximately along the section line 6—6 to expose an outlet opening at the end of the unsealed channel part 15. The stiffening member 40 may have some curvature and may be arranged to provide a function similar to that of the closure shown in FIGURE 23 of Patent No. 2,815,150. That is, member 40 may be bonded on to hold one side of the closure under tension allowing it to flex outwardly away from the member.

FIGURES 10 to 13 shown the end part of the container of FIGURE 1 with the closure means partly fabricated. These figures illustrate the side cuts and scores that are made in the material to provide a tear strip that can be manually torn off to expose the opening 15 at the end of the closure means. The tear strip is similar to that shown in Patent No. 2,815,150. The improvements herein lie in the method of making the side cuts and score lines. Preferably, these side cuts and score lines are made in the closure means before the holes 21 and 22 are punched and the stiffening member 20 applied.

As shown in FIGURES 10 to 13, side cuts as shown at 50 and 51 in the sealed area 13 is the end part of the container. Aligned with the side cuts are score lines on opposite sides of the material partway through the material. One of these score lines is designated at 53, there being a similar one on the opposite side of the closure means designated at 54. The side cuts may extend all the way to the score lines or almost thereto, as will be made clear hereinafter. These side cuts and score lines make it easy to remove the tear strip by tearing it off as explained in detail in the prior Patent No. 2,815,150. As will be observed, the closure means is completely and positively sealed until the tear strip is torn off after which the closure operates automatically in response to pressure exerted on the container. The stiffening member 20 is preferably positioned as explained in connection with FIGURES 3 and 5, the cuts and score lines being made just outwardly of the stiffening member. Preferably, however, the cuts and score lines are made before the stiffening member is applied.

Improved and effective means and methods or techniques are provided for making the cuts 50 and 51, and the score lines 53 and 54. The means and method are illustrated in FIGURES 14 to 17. Preferably, the means comprises a die or tool designated generally at 60 and shown partly in schematic form. A frame is provided in which there is an upper die 65 having side frame members 63 and 64, with the die 65 itself between them. Numerals 68 and 69 designate lower frame members having a lower die 73 between them. The upper die frame is movable vertically relative to the lower die frame, on vertical posts 76 and 77. The lower die 73 is in the form of a truncated pyramid having an upper narrower part 80 having a slot in it as designated at 81 in FIGURE 15, with ribs 82 and 83 adjacent the slot. The upper die has a depressed center portion 86 overlying the part 80 of the lower die with adjacent beveled surfaces complementary to the slanting or bevelled surfaces at the sides of the truncated pyramid form of the lower die 73.

The upper die has a rectilinear channel 90 in it and the lower die has a similar rectilinear channel 91 in it. Slidable in the channel 90 is a guide member 93 carrying a sharp-edged blade 94 in an angular position as shown, so that its edge 95 is on a slant with a downwardly extending point 96. The blade 90 moves in slot 98 having longitudinal ribs 100 and 101 at its lower edge to compress and hold the elastomeric material to insure that it will be cut rather than simply deforming. Slidable in the channel 91 of the die 73, is a guide member 102 having a similar sharp-edged knife blade 103 similarly carried thereby at an angle but opposite to the angle of the blade 94. The blade 94 has a pointed upwardly extending tip 104. It moves in a slot 105 similar to slot 98 and having similar longitudinal ribs along its upper edge.

Tool or die 60 may be embodied in any suitable machine having means for operating the tool or die, that is, for moving the upper die frame 60 towards the lower die into a position as shown in FIGURE 16. The machine also embodies suitable means for reciprocating the sliding, or guide members 93 and 102, as illustrated in the figures. When the members 93 and 102 move to the left, as illustrated in FIGURE 16, the knife blades 94 and 103 move to the left, as illustrated in FIGURE 16, the knife blades 94 and 103 move with them making the cuts 50 and 51 and the score lines 53 and 54 in the closure member or means 13. The configuration of the upper die 65 is complementary to the pyramidal configuration of the lower die as described and, accordingly, when the upper die 60 moves down the neck portion 13 is deformed into a configuration as shown in FIGURE 16 with the side edges deformed downwardly conforming to the complementary bevelled surfaces of the dies. The pointed tips 96 and 104 of the knife blades are spaced apart so as to make the score lines as described, without cutting all the way through the heat sealed portion 13. Due to the deformation of the edges of the portion 13 in the dies as shown in FIGURE 16, the lower knife 99 cuts through them completely, as illustrated in FIGURE 17, except for a very small gap between these side edge cuts and the upper score line as shown in FIGURE 17; this gap may be a small fraction of an inch and does not interfere with the purpose of the cuts and score lines (i.e.) to facilitate the easy tearing off of the tear strip.

FIGURE 18 illustrates an alternative form of the invention using a modified form of dies 65' and 73', other parts of the tool being similar and identified by similar numerals. Modified parts are identified by similar numerals primed. In this form of the invention, the upper die 65' has two downwardly extending ribs 110 and 111, lying transversely to the path of the knives or cutting edges. The lower die 73' has depressions or grooves 112 and 113 complementary to the ribs 110 and 111 and opposite them. When the upper die is lowered toward the lower die as shown in FIGURE 18, the ribs 110 and 111 on the upper die depress or deform portions of the sealed neck area 13' into the depressions or grooves 112 and 113 as shown. Side edge portions of the neck 13' extend beyond the portions depressed into the grooves 112 and 113. The ribs 110 and 111 and the grooves 112 and 113 may be relatively short, merely extending a short distance in a direction normal to the travel of the knives to make the depressions or deformations in these areas. When the knives 94 and 99 move to the left, they cut completely through the portions of the sealed area 13' that are depressed into the grooves 112 and 113, and make the score lines 53' and 54' similar to the manner in which they are made in the previous embodiment. After the sealed neck area 13' is removed from the die, side edge portions of the neck area 13, as designated at 116 and 117, are cut off and discarded, leaving edge cuts beginning at the edge and extending into the upper and lower score lines.

From the foregoing, those skilled in the art will observe and understand the nature of the invention and the manner in which its objectives and advantages are realized. The invention makes it possible to improve the positioning of the stiffening member of the closure means and to thereby render its effectiveness optimum. The improved holding means of the tangs of the stiffening member of FIGURE 9 provide a simple but effective way of realizing positive clamping and holding of the laterally stretched material at the neck or channel of the closure means.

The invention further provides for an easily removable tear off strip, and, particularly, an effective method or technique for providing the necessary cuts and score lines in the fabrication of the container and automatic closure means.

The foregoing disclosure is representative of preferred forms of the invention and is to be interpreted in an illustrative rather than in a limiting sense, and the invention to be accorded the full scope of the claims appended hereto.

What is claimed is:

1. The method of making an openable tube closure which comprises forming a flattened neck of resilient material having the flattened sides and an end sealed together leaving an interior channel wherein the sides are not sealed together, holding said neck of resilient material so that the said flattened neck is held in a plane with a side part of the neck deformed out of the said plane, moving a cutting edge transversely across the neck of resilient material in a position so that said cutting edge cuts completely through the side part of the said neck of resilient material and makes a score line partway through the material on the corresponding side of the neck, and moving a second cutting edge in a position to make a score line partway through the material of the opposite side of the flattened neck so that the end part of the neck of resilient material may be manually torn off along the said score lines beginning at said side edge cut to remove said end.

2. A method as in claim 1 including holding the neck with the intermediate part of the neck held in compression substantially in a plane and the side parts held in similar positions out of said plane, and moving said cutting edges in a direction parallel to said plane, transversely relative to the said channel.

References Cited

UNITED STATES PATENTS 3,008,366   11/1961   Taylor _____ 83—678 X

JAMES M. MEISTER, *Primary Examiner*.

U.S. Cl. X.R.

83—9, 176, 455, 695